United States Patent [19]

Roush et al.

[11] Patent Number: 5,670,233
[45] Date of Patent: Sep. 23, 1997

[54] ACOUSTIC WINDOW AND METHOD FOR MAKING THE SAME

[75] Inventors: Robert A. Roush, Norwich; Robert J. DeAngelis, Niantic, both of Conn.

[73] Assignee: The United States of America as represented by the Secretary of the Navy, Washington, D.C.

[21] Appl. No.: 496,490

[22] Filed: Jun. 29, 1995

[51] Int. Cl.$^6$ .............................. B29C 45/00; B32B 3/06
[52] U.S. Cl. .................. 428/99; 264/102; 264/328.1; 264/328.8; 264/328.13; 367/173; 367/174; 428/68; 428/69; 428/76; 428/423.1
[58] Field of Search ................... 428/99, 68, 69, 428/76, 423.1; 264/102, 328.1, 328.8, 328.12; 367/173, 174

[56] References Cited

U.S. PATENT DOCUMENTS 4,412,804  11/1983  Huther ............................. 264/102
5,276,658   1/1994  Bullat ............................... 367/174

FOREIGN PATENT DOCUMENTS 1954070   4/1971  Germany ........................... 264/102
4-286610 10/1992  Japan ............................... 264/102

*Primary Examiner*—Nasser Ahmad
*Attorney, Agent, or Firm*—Michael J. McGowan; Prithvi C. Lall; Michael F. Oglo

[57] ABSTRACT

A method for making polyurethane acoustic windows. A molding material is applied to a reservoir connected to the bottom of the mold to fill the mold under the influence of a vacuum applied at the top of the mold. After initialling filling the mold, a second reservoir connects to the vacuum port and additional material is added to the first reservoir to partially fill the second reservoir. Thereafter the mold with the reservoirs attached is located in a pressure oven for curing. After curing the mold an acoustic window is removed from the mold for post molding operations.

28 Claims, 4 Drawing Sheets

ACOUSTIC WINDOW AND METHOD FOR MAKING THE SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a process for molding products with a reduced incidence of imperfections. More particularly this invention is directed to acoustic windows and a process for molding such acoustic windows that are essentially free of imperfections that can distort acoustic energy passing through the acoustic window.

(2) Description of the Prior Art

There are a number of applications that utilize acoustic windows to isolate an acoustic energy transducer from the environment. For example, a ship may contain an acoustic window to isolate a sonar transducer from seawater. Ideally these windows have uniform transparency to acoustic energy transmitted or received by a transducer. Acoustic windows achieve such uniform transparency by having a relatively constant density across and throughout the window.

Molding processes typically are used to form such acoustic windows and any such process must minimize imperfections in the window to achieve uniform density. A major source of such imperfections is any gas that might be entrained or dissolved in the liquid molding material injected into a mold. During the curing process, this gas can expand and form voids in the molded article and thus produce an article with a nonconstant density. Over the years a number of process techniques have evolved for minimizing the formation of such voids. Generally these processes involve the use of compression or vacuum techniques applied either during the mixing of materials prior to injection into a mold, while the mold is being filled or while the material is curing in the mold.

For example, U.S. Pat. No. 3,803,281 to Fix discloses a method for molding polyurethane belts in which a mold initially is heated and evacuated. After the evacuation is complete, the vacuum is maintained in the mold. Material then is vacuum injected into the mold. The mold and injected material, with the vacuum applied, is heated to cure the material.

U.S. Pat. No. 4,030,953 to Rutschow et al. discloses a method for molding a fiberglass antenna. After a mold is assembled, vacuum lines located near the vertex of the top mold are connected to a vacuum pump and the resin is vacuum injected into the molds through other conduits until the resin runs out the associated vacuum lines. Heating begins and the resin conduits are blocked so that the vacuum can be maintained throughout the curing process.

U.S. Pat. No. 4,439,392 to Schutzler et al. discloses a method for making a glass laminated structure in which a vacuum is applied to hold glass surfaces in a spaced relationship and to allow a filler material to be installed between the plates. The casting of the filler is conducted in a heated container pressurized by nitrogen gas.

U.S. Pat. No. 5,122,176 to Goettler discloses a method for densifying a glass or glass composite structure. A structure is formed in a closed press box. The press box is evacuated while the object is being heated as part of the process.

U.S. Pat. Nos. 1,991,009 to Browne et al. and 3,551,541 to Rosetti disclose molding operations in which a vacuum minimizes the formation of voids in a molded product. More specifically, the Brown et al. patent discloses a method for forming a rubber printing plate in which an absorbent mold is made by plaster casting techniques. A vacuum is applied during the mixing of powdered plaster with water to degas any air entrapped between grains of powder. In the Rosetti patent, a method for polymerizing monomeric materials includes the steps of pouring a molding material into a vertically arranged mold and then evacuating the mold. More specifically the casting is initiated by a period for degassing the monomeric material at a relatively low temperature and evacuating the mold quickly to produce calm degassing of the monomeric material in the mold. This prevents air occlusions that can form bubbles or voids in the final product. During polymerization both the temperature of the mold and the pressure in the mold are allowed to increase under controlled conditions.

U.S. Pat. No. 4,810,444 to Alberino et al. discloses a method for making molded rim parts. The first step of the process is to provide a mold containing a fibrous reinforcing material. The mold is equipped with a structure for decreasing an overflow volume of resin to a final volume. Next the mold is evacuated. Resin is injected into the mold to fill the final volume and produce an overflow volume. Pressure is then applied to the mold prior to gelation to cause a decrease in at least a portion of the overflow volume. The process maintains this pressure until gelation occurs.

Notwithstanding these suggestions of various alternative molding processes acoustic windows are currently conventionally constructed by compression molding. A window mold is filled with uncured rubber and cured in apparatus that then compresses the molding material under a load of approximately 15 tons (approximately 1500 psi) at a temperature of between 300° F. and 350° F. The apparatus and attendant controls for producing acceptable acoustic windows are very costly. Moreover, the process is difficult to control in a repeatable and reliable fashion such that acoustic windows predictably are free of such imperfections.

SUMMARY OF THE INVENTION

Therefore it is an object of this invention to provide improved acoustic windows and an improved process for manufacturing acoustic windows.

Another object of this invention is to provide acoustic windows that are free of imperfections that can distort acoustic energy and a process for manufacturing such acoustic windows.

Yet another object of this invention is to provide a process for making an acoustic window more efficiently than has been achieved in the prior art.

In accordance with this invention a mold cavity corresponding to the final form of an acoustic window embodying this invention is prepared for the receipt of molding material. The cavity is positioned with a first port located above a second port. Vacuum is applied to the first or upper port while molding material is supplied from a first reservoir to the second or lower port whereby the pressure differential created by the vacuum displaces molding material into the cavity. When the molding material fills the cavity and begins to exit the first port, a second reservoir replaces the vacuum connection. The mold is then allowed to remain under heat and pressure until the product cures.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
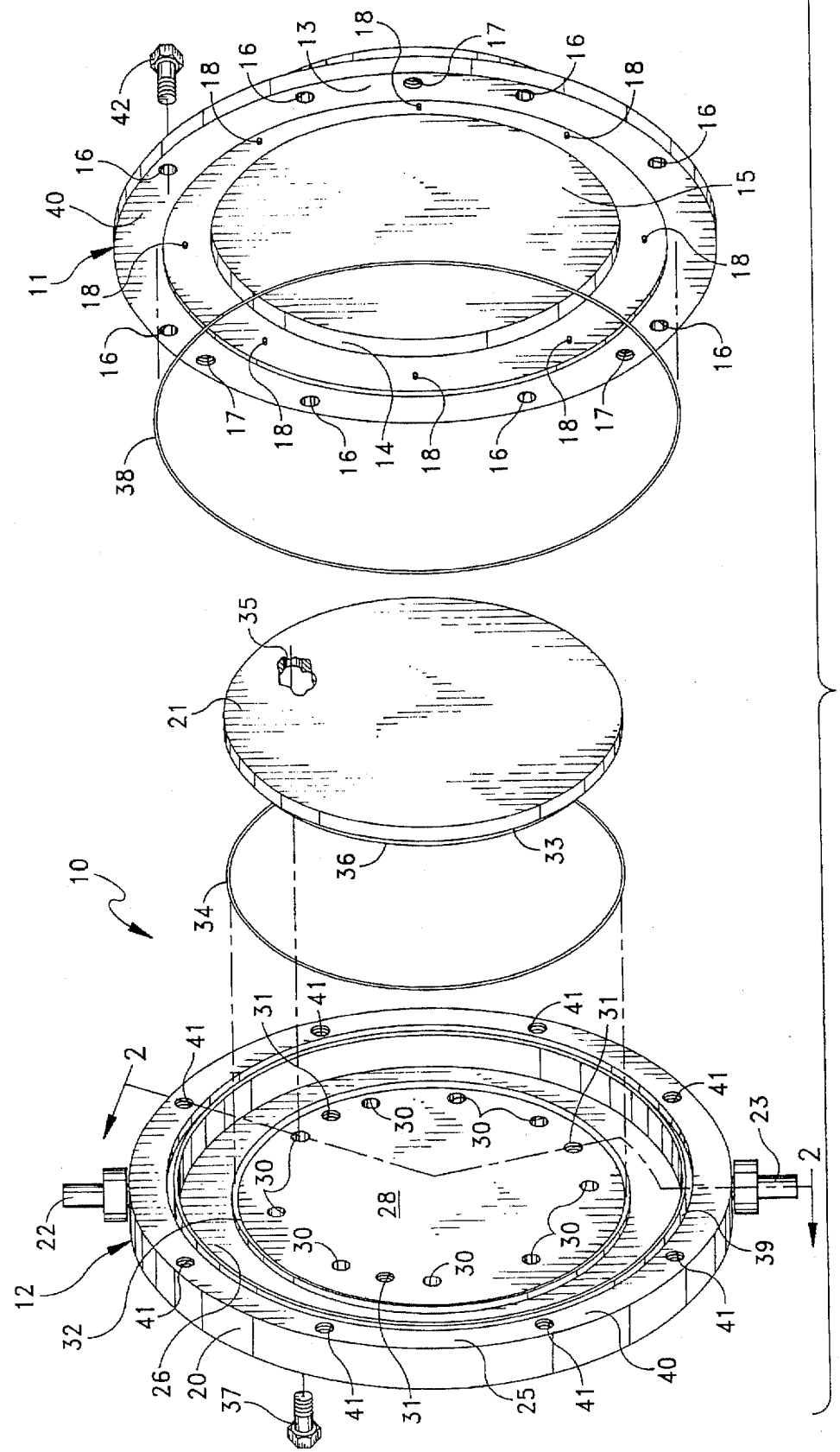
FIG. 1 depicts a mold for use with this invention in an exploded perspective view.
Figure 2:
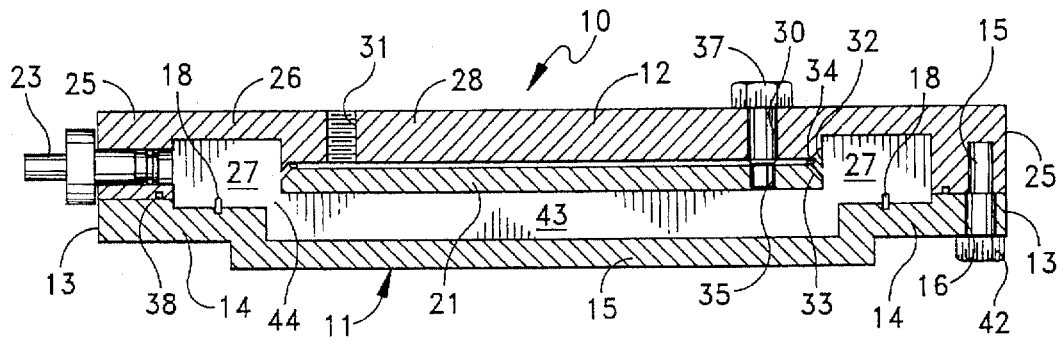
FIG. 2 is a cross-section of the mold taken along lines 2—2 in FIG. 1.

FIGS. 1 and 2 depict, in exploded perspective and cross-sectional views respectively, a mold 10 that is useful in constructing acoustic windows in accordance with this invention. The mold 10 comprises several distinct parts that include a first cavity plate 11 and a second cavity plate 12. The first cavity plate 11 has an annular outer flange 13. An inner annular step 14 connects the flange 13 to a central shelf 15. A series of lead holes 16 are equiangularly spaced about the flange, and a plurality of threaded jacking holes 17 are also equiangularly spaced about the flange, but offset from the lead holes 16. In this particular embodiment the annular outer flange 13 contains eight lead holes 16 and three threaded jacking holes 17. There are also dispersed about the first cavity plate 11 a series of index pins 18 that, as will be more apparent later, provide positioning information for post molding processing.

The second cavity plate 12 is an assembly of an outer plate 20 and an inner plate 21 with a vacuum port 22 and a fill port 23 attached to the outer plate 20. The outer plate 20 has an outer annular flange 25 and a stepped or web portion 26 that forms a boundary of a cavity 27. The web portion 26 is intermediate the annular flange 25 and a central portion 28. The central portion 28 has a plurality of lead holes 30 (in this example eight such lead holes) equiangularly spaced about the periphery of the central portion and three threaded jacking holes 31 equiangularly spaced about the periphery of the central portion 28, but offset from the lead holes 30. An axially extending peripheral lip 32 circumscribes the edge of the central portion 28 to define a cup shaped volume for receiving the inner plate 21.

The inner plate 21 has a chamfered peripheral corner 33 that facilitates the placement of the inner plate 21 against the central section 28 and, with the peripheral lip 32 captures an O-ring 34 between the peripheral lip 32 and the lead holes 30. A plurality of blind threaded apertures 35 are formed from a surface 36 that mates against the central portion 28 so that fastening devices, such as a bolt 37 can extend through each of the lead holes 30 and engage the threaded holes 35 without intruding into the cavity.

After assembling the inner plate 21, outer plate 20 and O-ring 34 by means of bolts 37 or other fastening or clamping devices, the mold 10 is completed by disposing an O-ring 38 in an O-ring groove 39 formed in a radial surface 40 of the flange 25 intermediate the web portion 26 and a plurality of threaded holes 41. Specifically the first cavity plate 11 and second cavity plate 12 are brought together with the lead holes 16 and threaded holes 41 in alignment. Bolts 42 or other fastening or clamping devices join the first cavity plate 11 and second cavity plate 12 together.

As particularly shown in FIG. 2, when assembled the first and second cavity plates 11 and 12 of the mold 10 define the flange cavity 27, a central cavity 43 and an interconnecting web cavity 44. Moreover the O-rings 34 and 38 seal the total cavity comprising the central section 42, web section 43 and flange section 27, so the only access into the mold 10 is through the fill port 23 and the vacuum port 22 shown in FIG. 1.

Referring now to FIGS. 1 through 4, in a first step 50 (FIG. 3) the mold 10 is prepared for a molding operation. If the mold 10 has been previously assembled, the first cavity plate 11 and second cavity plate 12 are separated by removing the bolts 42. If necessary three of the bolts 42 can be threaded into the threaded jacking holes 17 to bear against the radial surface 40 of the flange 25 and force the first and second cavity plates 11 and 12 apart. Similarly, the bolts 37 are removed and inserted back through the threaded jack holes 31 to facilitate separation of the outer plate 21 and inner plate 21. In this particular embodiment, the vacuum port 22 and fill port 23 are threaded into the flange 25 so they can also be removed, cleaned and reassembled with any sealing O-rings as may be required. The construction of such vacuum and fill ports 22 and 23 is well known in the art and not discussed further.

After disassembly, various solvents known in the art are used to clean all the components. The outer and inner plates 20 and 21 are reassembled with a lubricated O-ring 34. The inner surfaces of the mold 10 are coated with a release agent. The use of such release agents is well-known in the art. In one particular embodiment of this invention, a Miller Stevenson MS-136 hot mold release is sprayed on all the internal surfaces of the mold. Thereafter bolts 42 secure the first and second cavity plates 11 and 12 together to form the final cavity shown in FIG. 2.

Figure 4:
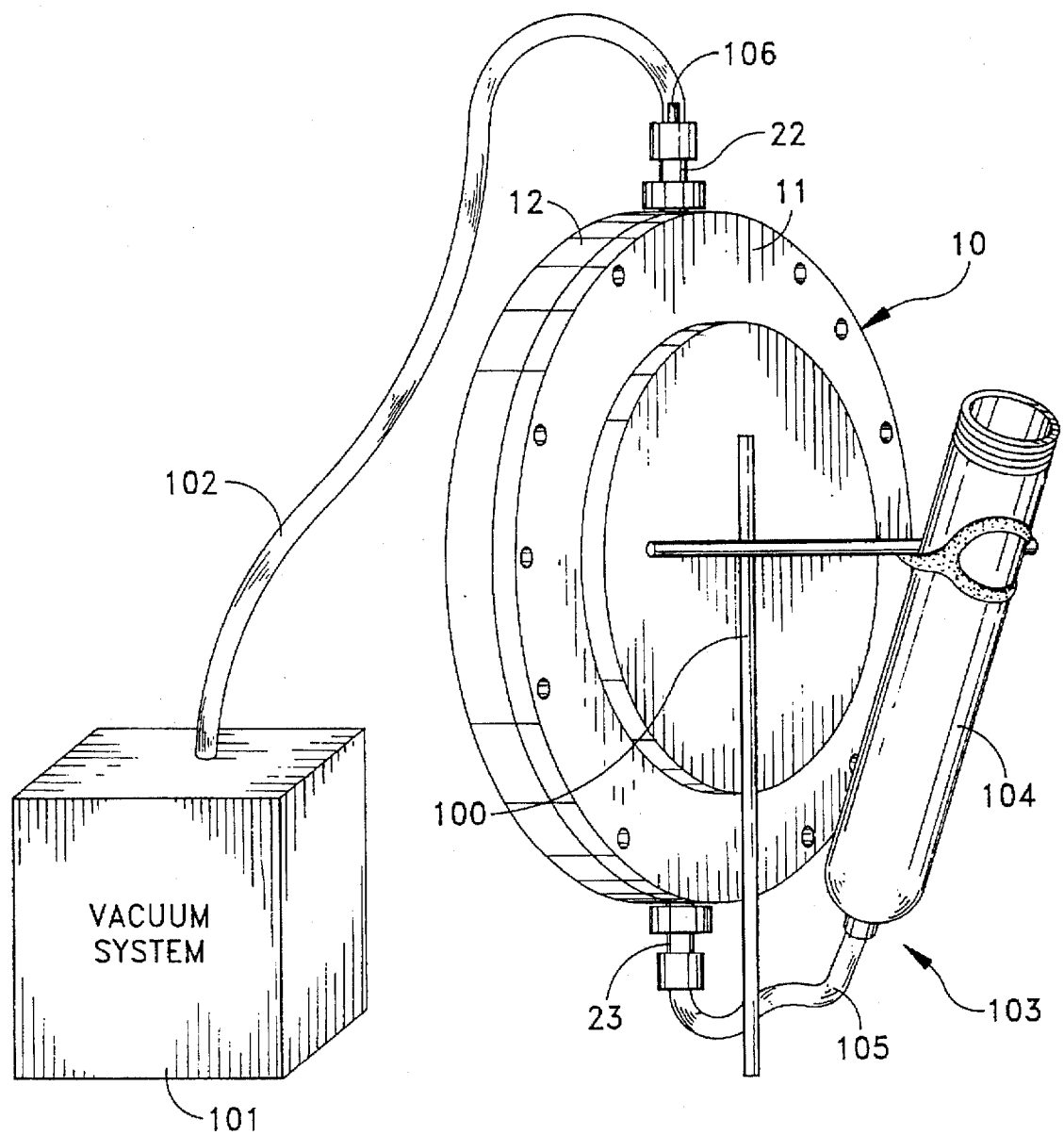
FIG. 4 pictorially depicts the mold and related process apparatus during one step of the process shown in FIG. 3.

Next the mold 10 is positioned as shown in FIG. 4 so that a supporting and clamping structure 100 orients the mold 10 in a vertical plane with the vacuum port 22 disposed above the fill port 23, preferably directly above the fill port 23, so that the vacuum port 22 is at the highest point in the mold. Next, a vacuum system 101 is attached by means of a vacuum tube 102 to the vacuum port 22 and a supply system or first reservoir 103 comprising a cartridge 104 and connecting tube 105 is connected to the fill port 23.

Figure 3:
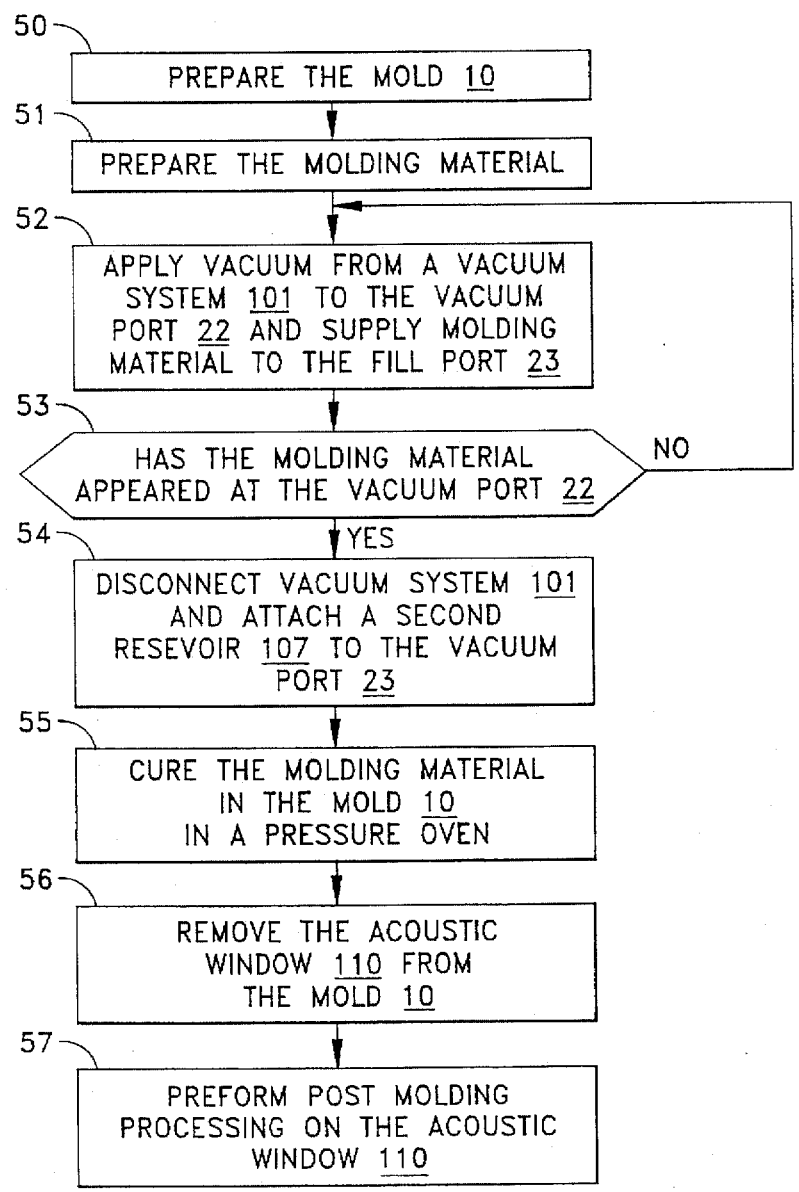
FIG. 3 lists the major process steps for forming an acoustic window in accordance with this invention.

Step 51 in FIG. 3 represents the preparation of a molding material. Although shown in sequence after step 50, it is possible to perform step 51 simultaneously with or previously to step 50. In a preferred embodiment, the molding material comprises a two-part polyurethane solution with an appropriate coloring material. In one particular embodiment, 2,000 grams of Conathane EN-6 Part A is added to 250 grams of Conathane EN-6 Part B and 25 to 30 grams of black colorant DS1832, all supplied by Conap, Inc. This liquid is degassed after thorough mixing typically by dividing the mixture substantially in half, and degassing one half and then another by positioning the mixture in a vacuum chamber.

Next, as depicted in step 52, the first half and, as needed, the second half, of the liquid polyurethane is poured into the cartridge 104 and the vacuum system 101 begins to draw a vacuum within the mold 10. The pressure in the mold 10 should not be less than about 25 inches of Mercury or about 0.8 atm. As the pressure in the mold 10 decreases, the atmosphere forces the liquid urethane from the cartridge 104 through the fill port 23 located at the bottom of the mold 10 and fills the mold 10 to the top.

Figure 5:
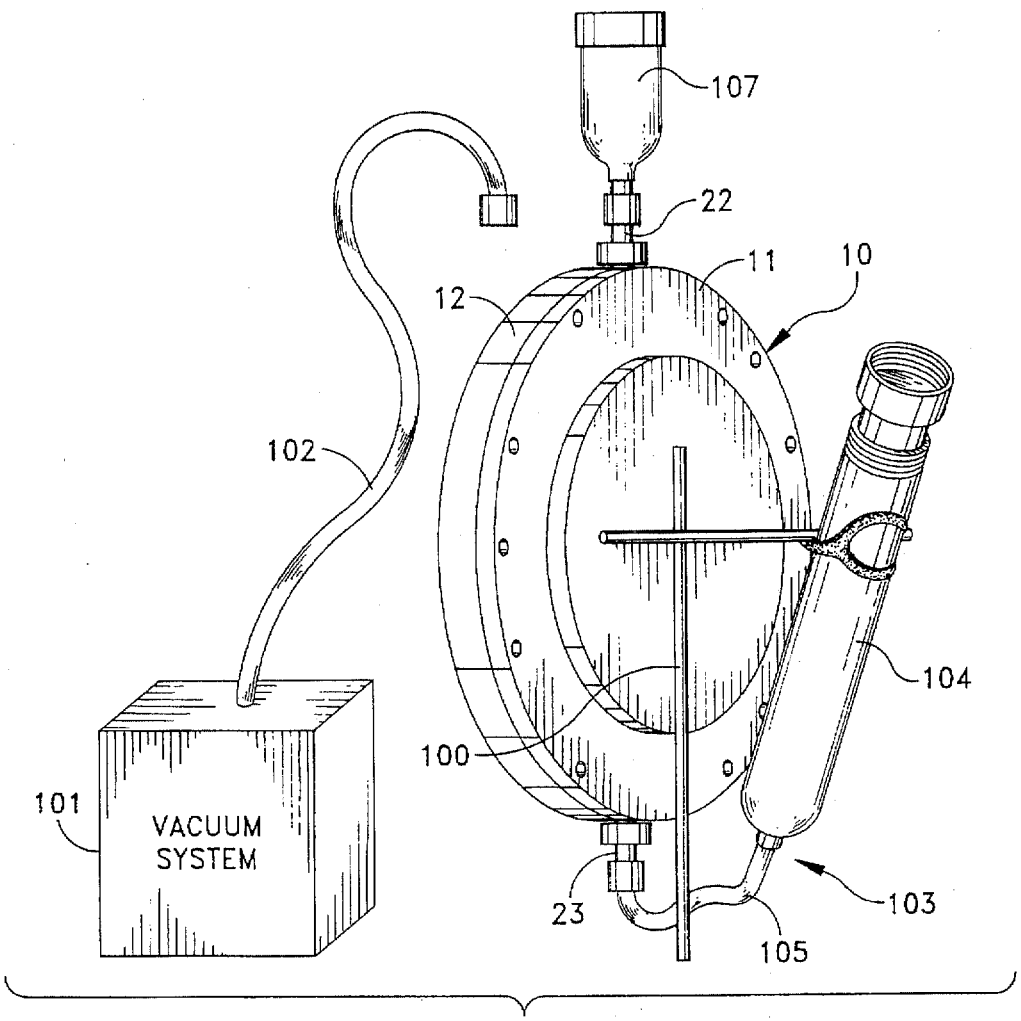
FIG. 5 pictorially depicts the mold and other related process apparatus at another step of the process in FIG. 3.

Step 53 represents an inspection or monitoring process to determine when the mold 10 is filled. Typically, the vacuum line 102 is transparent, so an operator merely watches for the appearance of the opaque molding material in the vacuum line 102 proximate the vacuum fill port 22. In FIG. 4, for example, molding material 106 has begun to appear in the vacuum tube 102. It will also be apparent that any of various types of electronic,. electromechanical or mechanical monitoring devices could determine whether the mold 10 met the criteria for being filled. For example, a simple photodetective cell and lamp assembly could monitor the contents of the vacuum line 102 proximate the vacuum fill port 22. As depicted by steps 52 and 53, this filling process continues until the mold is filled. Once the mold is filled, step 53 diverts to step 54 in FIG. 3. As shown in FIGS. 4 and 5, in step 54 an operator turns off the vacuum system 101 and replaces the hose 102 connection to the vacuum port 22 with a second reservoir 107 that is open to the atmosphere. Adding molding material to the cartridge 104 and forcing that material into the mold 10 by a plunger or other means causes material to exit the vacuum port 22 and partially fill the reservoir 107, typically to about one half its capacity.

In accordance with step 55 the mold 10, together with the attached clamping system 100, first reservoir 104 and second reservoir 107, is placed in a pressure oven (not shown, but well known in the art). With this particular polyurethane molding material, the oven operates at a temperature of about 100° C. and at a pressure of about 75 psig for about eight hours. During the curing process, the pressure acting on the exposed molding material in the reservoirs 104 and 107 displaces material into the interior of the mold 10 as necessary to compensate for any shrinkage in the molding material that might occur during the curing process. If any gas remains in the material, even after the preliminary degassing operations in step 51, the pressure compresses this gas into bubbles that are less than about 0.032 inches in diameter. Gas bubbles smaller than that size do not distort acoustic energy passing through the resulting acoustic window.

Figures 6, 7:
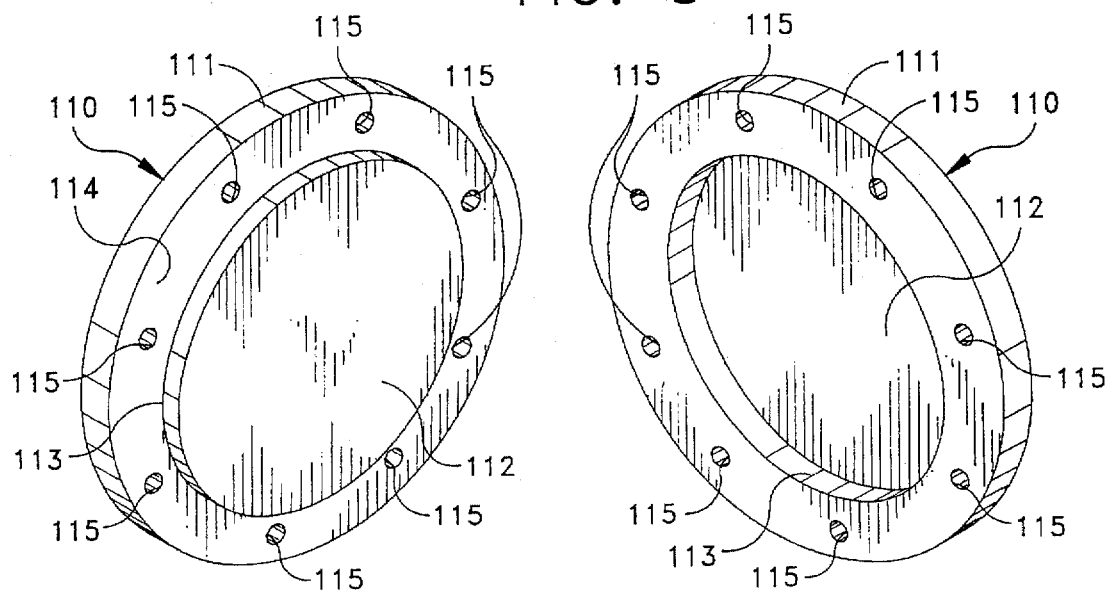
FIG. 6 is a view of a completed acoustic window constructed in accordance with this invention shown from one perspective.
FIG. 7 is a view of the acoustic window shown from another perspective.

After cooling, the mold 10 is removed from the oven and allowed to cool as shown in step 56. Thereafter the bolts 42, as shown in FIG. 1, can be removed from the lead holes 16 and threaded holes 41 and a number of these bolts 42 can then be reinserted through the threaded jacking holes 17 to separate the first cavity 11 and second cavity 12. Any extensions of cured material into the vacuum port 22 and the fill port 23 are severed by cutting or a similar process and a molded acoustic window 110 having the general form shown in FIGS. 6 and 7, is removed. A visual inspection indicates whether any flaws exist.

FIGS. 6 and 7 present two perspective views of the window 110. The window 110 includes an annular flange 111 formed in the cavity 27 shown in FIG. 2, a central portion 112 formed in the cavity 43 and a web portion 113 formed in the web cavity 44 shown in FIG. 2.

As previously described, the first cavity plate 11 in FIG. 1 includes a plurality of axially extending pins 18. During molding these pins 18 form centering points in a radial surface 114 of the flange 111. Additional post molding processing includes the step of boring mounting holes 115 through the flange 111 thereby to allow the flange 111 to be connected in a supporting structure in a sealing relationship. In this particular embodiment eight such mounting holes are shown. Any other number (e.g., 16) of equally spaced mounting holes can be used. The sealing requirements around the flange determine the actual number of mounting holes.

In accordance with this invention, there has been described an improved process, outlined particularly in FIG. 3, for manufacturing acoustic windows. The use of vacuum filling and pressurized curing minimizes the effects of any gas entrapped in a liquid molding material so that the resulting acoustic windows are free of imperfections that can distort acoustic energy. The mold can be simply formed of standard materials, such as aluminum, with minimal machining. This feature together with the ease of disassembly and mold preparation reduces the cost of manufacture for such acoustic windows. The acoustic window 110, shown in FIGS. 5 and 6 therefore can be produced economically, has a flange 111 that readily connects to supporting structure, and has a central portion 112 that is free of imperfections that could distort acoustic energy passing through the window 110.

This invention has been disclosed in terms of certain embodiments. It will be apparent that many modifications can be made to the disclosed apparatus without departing from the invention. For example, this invention has been disclosed in terms of the construction of an acoustic window with a particular type of polyurethane molding material that is cured under particular operating conditions. Other materials might be utilized that will operate with other conditions. Moreover, the disclosed mold produces an acoustic window of a particular cross-sectional shape. Other configurations can also be provided by modifying the overall configuration of the mold. It is also possible to utilize alternate apparatus with a particular mold. For example a wye-valve might attach a common outlet to the vacuum port 22 and the inputs to the vacuum hose 102 and the second reservoir. Therefore, it is the intent of the appended claims to cover all such variations and modifications as come within the true spirit and scope of this invention.

What is claimed is:

1. A method for forming an article in a mold wherein the mold defines a molding cavity and has first and second spaced ports to the molding cavity and wherein the article is formed of a polyurethane molding material, said method comprising the steps of:

preparing the mold cavity for the receipt of the molding material;

positioning the mold cavity with the first port located above the second port;

simultaneously applying a vacuum to the first port and supplying the molding material from a first reservoir to the second port such that the pressure differential created by the vacuum displaces molding material into the cavity;

removing the vacuum from the first port and applying a second reservoir thereto after molding material begins to exit the first port;

adding additional molding material to the molding cavity through said first reservoir to displace molding material through the first port into the second reservoir;

simultaneously applying heat to the mold and external pressure to the first and second reservoirs so as to heat and compress the molding material and curing the molding material into a solid cured polyurethane article by placing it in an oven operating at about 100° C. and at a pressure of about 75 psig; and thereafter removing the solid cured polyurethane article from the mold.

2. A method as recited in claim 1 additionally comprising the steps of mixing the molding material and degassing the mixed molding material.

3. A method as recited in claim 2 wherein said step of simultaneously applying heat and pressure includes placing the mold with the first and second reservoirs attached in the interior of a pressurized oven.

4. A method as recited in claim 3 wherein said step of applying a vacuum to the first port includes decreasing the pressure within the mold by means of a vacuum pumping system.

5. A method as recited in claim 1 wherein said step of simultaneously applying heat and pressure includes placing the mold with the first and second reservoirs attached in the interior of a pressurized oven.

6. A method as recited in claim 5 wherein said step of applying a vacuum to the first port includes decreasing the pressure within the mold by means of a vacuum pumping system.

7. A method of making from a moldable polyurethane material an acoustic window that is free of imperfections that can distort acoustic energy, said method comprising the steps of:

preparing a mold cavity having the form of the acoustic window for the receipt of the polyurethane molding material;

preparing the polyurethane molding material for injection into the mold;

positioning the mold cavity with the first port located above the second port;

simultaneously applying a vacuum to the first port and supplying the polyurethane molding material from a first reservoir to the second port such that the pressure differential created by the vacuum displaces the polyurethane molding material into the cavity thereby to fill the mold;

removing the vacuum from the first port and applying a second reservoir thereto after polyurethane molding material begins to overfill the mold;

adding additional polyurethane molding material into the cavity through the first reservoir and second port so as to displace polyurethane molding material through the first port into the second reservoir;

simultaneously applying heat to the mold and external pressure to the polyurethane molding material in the first and second reservoirs so as to heat and compress the polyurethane molding material and curing the polyurethane molding material into a solid cured polyurethane acoustic windows by placing it in an oven operating at about 100° C. and at a pressure of about 75 psig; and thereafter removing the solid cured polyurethane acoustic window from the mold.

8. A method as recited in claim 7 wherein said polyurethane molding material is formed from two liquid components and the preparation of the polyurethane molding material includes mixing the components together to form a mixture and degassing the mixture.

9. A method as recited in claim 8 wherein said heating and pressurizing of the polyurethane molding material in the mold includes the step of placing the mold and the first and second reservoirs in a pressurized oven.

10. A method as recited in claim 9 wherein said step of applying a vacuum to the first port includes decreasing the pressure within the mold by means of a vacuum pumping system.

11. A method as recited in claim 8 wherein said heating and pressurizing of the polyurethane molding material in the mold includes the step of placing the mold and the first and second reservoirs in a pressurized oven operating at a temperature of about 100° C. at a pressure of about 70 psig for a period of approximately eight hours.

12. A method as recited in claim 11 wherein said step of applying a vacuum to the first port includes decreasing the pressure within the mold by means of a vacuum pumping system for reducing the pressure within the mold by about one-sixth atmosphere.

13. A method as recited in claim 12 additionally comprising the step of adding additional polyurethane molding material into first receptacle thereby to displace polyurethane molding material from the mold into the second reservoir.

14. A method as recited in claim 13 wherein the acoustic window is to be attached to a support and is formed with a central portion and flange portion and additionally comprising the step of forming a plurality of angularly spaced mounting holes through the flange to facilitate mounting of the acoustic window on the support.

15. A cured polyurethane molded product formed of a polyurethane molding material in a mold wherein the mold defines a molding cavity and has first and second spaced ports to the molding cavity, said product being formed by the process comprising the steps of:

preparing the mold cavity for the receipt of the molding material;

positioning the mold cavity with the first port located above the second port;

simultaneously applying a vacuum to the first port and supplying the molding material from a first reservoir to the second port such that the pressure differential created by the vacuum displaces molding material into the cavity;

removing the vacuum from the first port and applying a Second reservoir thereto after molding material begins to exit the first port;

adding additional molding material to the molding cavity through said first reservoir to displace molding material through the first port into the second reservoir;

simultaneously applying heat to the mold and external pressure to the first and second reservoirs so as to heat and compress the molding material and curing the molding material into a solid cured polyurethane article by placing it in an oven operating at about 100° C. and at a pressure of about 75 psig; and thereafter removing the solid cured polyurethane article from the mold.

16. A product as recited in claim 15 in which the method additionally comprises the steps of mixing the molding material and degassing the mixed molding material.

17. A product as recited in claim 16 wherein said step of simultaneously applying heat and pressure includes placing the mold with the first and second reservoirs attached in the interior of a pressurized oven.

18. A product as recited in claim 17 wherein said step of applying a vacuum to the first port includes decreasing the pressure within the mold by means of a vacuum pumping system.

19. A product as recited in claim 15 wherein said step of simultaneously applying heat and pressure includes placing the mold with the first and second reservoirs attached in the interior of a pressurized oven.

20. A product as recited in claim 19 wherein said step of applying a vacuum to the first port includes decreasing the pressure within the mold by means of a vacuum pumping system.

21. A molded polyurethane acoustic window that is free of imperfections that can distort acoustic energy formed by the process comprising the steps of:

preparing a mold cavity having the form of the acoustic window for the receipt of the polyurethane molding material;

preparing the polyurethane molding material for injection into the mold;

positioning the mold cavity with the first port located above the second port;

simultaneously applying a vacuum to the first port and supplying the polyurethane molding material from a first reservoir to the second port such that the pressure differential created by the vacuum displaces the polyurethane molding material into the cavity thereby to fill the mold;

removing the vacuum from the first port and applying a second reservoir thereto after polyurethane molding material begins to overfill the mold;

adding additional polyurethane molding material into the cavity through the first reservoir and second port so as to displace polyurethane molding material through the first port into the second reservoir;

simultaneously applying heat to the mold and external pressure to the polyurethane molding material in the first and second reservoirs so as to heat and compress the polyurethane molding material and curing the molding material into a solid cured polyurethane acoustic window by placing it in an oven operating at about 100° C. and at a pressure of about 75 psig; and thereafter removing the solid cured polyurethane acoustic window from the mold.

22. An acoustic window as recited in claim 21 wherein said polyurethane molding material is formed from two liquid components and the preparation of the polyurethane molding material includes mixing the components together to form a mixture and degassing the mixture.

23. An acoustic window as recited in claim 22 wherein said heating and pressurizing of the polyurethane molding material in the mold includes the step of placing the mold and the first and second reservoirs in a pressurized oven.

24. An acoustic window as recited in claim 23 wherein said step of applying a vacuum to the first port includes decreasing the pressure within the mold by means of a vacuum pumping system.

25. An acoustic window as recited in claim 22 wherein said heating and pressurizing of the polyurethane molding material in the mold includes the step of placing the mold and the first and second reservoirs in a pressurized oven operating at a temperature of about 100° C., at a pressure of about 70 psig for a period of approximately eight hours.

26. An acoustic window as recited in claim 25 wherein said step of applying a vacuum to the first port includes decreasing the pressure within the mold by means of a vacuum pumping system for reducing the pressure within the mold by about one-sixth atmosphere.

27. An acoustic window as recited in claim 26 additionally comprising the step of adding additional polyurethane molding material into first receptacle thereby to displace polyurethane molding material from the mold into the second reservoir.

28. An acoustic window as recited in claim 27 wherein the acoustic window is to be attached to a support and is formed with a central portion and flange portion and additionally comprising the Step of forming a plurality of angularly spaced mounting holes through the flange to facilitate mounting of the acoustic window on the support.

\* \* \* \* \*